United States Patent
Kearney (10) Patent No.: US 10,261,967 B2
(45) Date of Patent: Apr. 16, 2019

(54) DATA EXTRACTION

(71) Applicant: BRITISH TELECOMMUNICATIONS PUBLIC LIMITED COMPANY, London (GB)

(72) Inventor: Paul Kearney, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 15/546,325

(22) PCT Filed: Dec. 7, 2015

(86) PCT No.: PCT/EP2015/078774
§ 371 (c)(1),
(2) Date: Jul. 26, 2017

(87) PCT Pub. No.: WO2016/119954
PCT Pub. Date: Aug. 4, 2016

(65) Prior Publication Data
US 2018/0268081 A1    Sep. 20, 2018

(30) Foreign Application Priority Data
Jan. 28, 2015  (EP) .................................. 15275027

(51) Int. Cl.
*G06F 17/30* (2006.01)
*G06F 16/903* (2019.01)
(Continued)

(52) U.S. Cl.
CPC .... *G06F 16/90344* (2019.01); *G06F 17/2705* (2013.01); *G06F 17/277* (2013.01);
(Continued)

(58) Field of Classification Search
CPC .. G06F 17/277; G06F 17/271; G06F 2216/03; G06F 17/2735; G06F 17/274; G06F 8/427
(Continued)

(56) References Cited

U.S. PATENT DOCUMENTS 7,797,348 B2 * 9/2010 Luk .................. H04L 45/00
707/802
8,065,293 B2 * 11/2011 Mukerjee .............. G06F 16/322
707/711
(Continued)

FOREIGN PATENT DOCUMENTS

EP    2 309 400    4/2011

OTHER PUBLICATIONS

International Search Report for PCT/EP2015/078774, dated Mar. 2, 2016, 3 pages.
(Continued)

*Primary Examiner* — Angelica Ruiz
(74) *Attorney, Agent, or Firm* — Nixon & Vanderhye PC (57) ABSTRACT

A computer implemented method is provided for creating a regular expression for extracting data from a data set. The method comprises the steps of: identifying a first common substring, the first common substring being present in at least two data entry strings of a first data set, by comparing a first and second data entry string of the first data set; and creating a first regular expression for extracting data from a second data set, the first regular expression including a first part for matching the first common substring.

17 Claims, 10 Drawing Sheets

(51) Int. Cl.
 *H04L 12/24* (2006.01)
 *G06F 17/27* (2006.01)
 *G06F 17/28* (2006.01)
(52) U.S. Cl.
 CPC ........ *G06F 17/2872* (2013.01); *H04L 41/069* (2013.01); *H04L 41/0631* (2013.01)
(58) Field of Classification Search
 USPC .......................................................... 707/758
 See application file for complete search history.

(56) References Cited

U.S. PATENT DOCUMENTS

| | | | | |
|---|---|---|---|---|
| 8,812,480 | B1* | 8/2014 | Watson | G06F 16/3331 707/710 |
| 2006/0282442 | A1* | 12/2006 | Lennon | G06F 17/30011 |
| 2009/0112905 | A1* | 4/2009 | Mukerjee | G06F 17/30625 |
| 2009/0282391 | A1 | 11/2009 | Gutierrez et al. | |
| 2012/0005184 | A1* | 1/2012 | Thilagar | G06F 17/30979 707/706 |
| 2014/0201838 | A1* | 7/2014 | Varsanyi | G06F 21/552 726/23 |
| 2015/0019466 | A1 | 1/2015 | Avidian et al. | |

OTHER PUBLICATIONS

Written Opinion of the ISA for PCT/EP2015/078774, dated Mar. 2, 2016, 9 pages.
Search Report for EP Appln No. 15275027.9, dated Aug. 31, 2015, 6 pages.
International Preliminary Examination Report for PCT/EP2015/078774, dated Jan. 16, 2017, 15 pages.
"Extract fields interactively with IFX", Splunk Enterprise Knowledge Manager Manual 5.0.5, *Splunk, Inc.*, 2017, 5 pages.
"Grammar-based code", *Wikipedia*, https://en.wikipedia.org/w/index.php?title=Grammar-based_code&oldid=583139404 Nov. 2013, 2 pages.
Li et al., "Regular Expression Learning for Information Extraction", *Association for Computational Linguistics*, Oct. 2008, pp. 21-30.
"RecordBreaker: Automatic structure for your text-formatted data", *Cloudera*, http://web.archive.org/web/20131101120250/http://cloudera.github.io/RecordBreaker/, Jun. 2013, 7 pages.

* cited by examiner

1001 ──▶<189>Sep 1 18:07:09  IPAdd1   Sep: 1 18:07:09.976: %SSHD-5-VERBOSE: Failed none for  Var1   from    IPAdd:Port1   ssh2
1002 ──▶<188>Sep 1 18:07:09  IPAdd3   Sep: 1 18:07:09.885: [255/22:1:27/3/2/72424]: %QOS-4-WARN: Config event (0x10010013) circuit params
         requeued 5 times, 255/22:1:27/3/2/72424
1003 ──▶<189>Sep 1 18:07:09  IPAdd3   Sep: 1 18:07:09.884: %AAA-5-NOTICE: [local] administrator:  Var2   logged in via    Site1   , host:
         IPAdd4
1004 ──▶<188>Sep 1 18:07:09  IPAdd5   Sep: 1 18:07:09.867: [255/22:1:29/3/2/108528]: %QOS-4-WARN: Config event (0x10010013) circuit
         params requeued 5 times, 255/22:1:29/3/2/108528
     <189>Sep 1 18:07:09  IPAdd6   Sep: 1 18:07:09.829: %AAA-5-NOTICE: [local] administrator:  Var3   found on   Site2   from
         IPAdd7  - recording as logged out
     <188>Sep 1 18:07:09  IPAdd8   33 Sep: 1 18:07:09.797: [255/22:1:29/3/2/302210]: %QOS-4-WARN: Config event (0x10010013) circuit
         params requeued 5 times, 255/22:1:29/3/2/302210
     <187>Sep 1 18:07:09  IPAdd9   Sep: 1 18:07:09.608: [255/22:1:27/3/2/299055]: %QOS-3-RCM_ERR: Sub processing failed: bind policy
         [7000]: error code 48: error message: qos policy needs to be defined before binding on the circuit
     <184>Sep 1 18:07:09  IPAdd10  Sep: 1 18:07:09.602: [255/22:1:27/3/2/299055]: %QOS-0-RCM:  qos rcm error:  ckt can't find policy
         (media_set) 7000 error code 2
     <190>Sep 1 18:07:09  IPAdd11  29 Sep: 1 18:07:09.438: %AAA-6-INFO: [local] recorded login for administrator:    Var4
     <189>Sep 1 18:07:09  IPAdd12  29 Sep: 1 18:07:09.434: %AAA-5-NOTICE: [local] administrator:    Var5    logged in via    Site3
         host: IPAdd13
     <190>Sep 1 18:07:09  IPAdd14  |29 Sep: 1 18:07:09.376: %SSHD-6-INFO: Accepted password for  Var6   from   IPAdd15   port 51014
         ssh2
     <189>Sep 1 18:07:09  IPAdd15  Sep: 1 18:07:09.340: %AAA-5-NOTICE: [local] administrator:  Var7   found on   Site4   from
         IPAdd16  - recording as logged out
1013 ──▶<189>Sep 1 18:07:09    IPAdd17   Sep: 1 18:07:09.282: %SSHD-5-VERBOSE: Failed none for  Var1    from    IPAdd:Port2    ssh2
     <190>Sep 1 18:07:09  IPAdd19  Sep: 1 18:07:09.146: %AAA-6-INFO: [local] recorded login for administrator:   Var9
     <189>Sep 1 18:07:09  IPAdd20  Sep: 1 18:07:09.143: %AAA-5-NOTICE: [local] administrator:  Var10  logged in via    Site5    host:
         IPAdd21
     <190>Sep 1 18:07:09  IPAdd22  Sep: 1 18:07:09.076: %SSHD-6-INFO: Accepted password for  Var11 from     IPAdd23    port 41769
         ssh2
     <189>Sep 1 18:07:09  IPAdd24  Sep: 1 18:07:09.054: %SSHD-5-VERBOSE: SSHD:  Var12
     <189>Sep 1 18:07:09  IPAdd25  Sep: 1 18:07:09.048: %SSHD-5-VERBOSE: Enabling compatibility mode for protocol 2.0
1019 ──▶<189>Sep 1 18:07:09  IPAdd26  Sep: 1 18:07:09.007: %SSHD-5-VERBOSE: Failed $Var_{13}$ for Var14 from         IPAdd:Port3
         ssh2
     <189>Sep 1 18:07:09  IPAdd27  30 Sep: 1 18:07:08.998: %AAA-5-NOTICE: [local] administrator:  Var15   found on   Site6   from
         IPAdd28   record as logged out.

DATA EXTRACTION

This application is the U.S. national phase of International Application No. PCT/EP2015/078774 filed 7 Dec. 2015 which designated the U.S. and claims priority to EP Application No. 15275027.9 filed 28 Jan. 2015, the entire contents of each of which are hereby incorporated by reference.

FIELD OF THE INVENTION

The present invention relates to a method and apparatus for extracting data from one or more data sources.

BACKGROUND TO THE INVENTION

A modern ICT system contains sufficient processing power, network connectivity speed and memory that the system is able to capture and store large amounts of data relating to one or more components of the system. For example, in telecommunications, Network Operators are able to capture log data relating to many subscriber lines in their network (such as data rates, error rates, etc.), which is reported back to a Network Management System. In an example in a security aspect of the telecommunications sector, Network Operators are also able to capture large amounts of data relating to the traffic flowing through the core network, which may be analysed to detect adverse behaviour in the event of a security breach. Generally, the amount of data which may be captured in modern ICT systems is now so vast and/or complex that its analysis is beyond the capabilities of traditional processing techniques. A new field, known as big data analytics, has emerged to tackle such data sets.

It is well known that a large data set (such as a log data file of multiple subscriber lines in a network or traffic data flowing in the network) often has latent within it information that can be utilised for valuable purposes such as in network optimization, network failure detection or security breach analysis. However, due to the inherent difficulties in extracting the relevant data from such large data sets, such analysis is often only performed on limited samples of data after an event has occurred. For example, following a network failure event, a Network Operator may extract the relevant log data for the subscriber lines that suffered the fault with the aim of determining the network failure's cause. It is of course preferable to pre-empt such events rather than react. Accordingly, there is a desire to collect and analyse the data in real time to detect and anticipate such problems.

One of the problems faced in data analytics is that input data is collected in a variety of structured and unstructured formats. When the data set increases in volume (for example, because the amount of data being collected from a single source increases or due to the data being collected from an increasing number of sources), then the lack of uniform structure in the data set makes it almost impossible to analyse. Thus, an initial step of data analytics is to organise the data into a suitable format for post-processing. This may be achieved by a data extraction method, in which a subset of semantically-significant data from the data set is identified and re-expressed in a format such that it may be analysed or stored for later analysis.

One prior art approach to this problem was the use of regular expressions to identify and extract data entries or a part thereof from a data set. For example, a data set collected at a Digital Subscriber Line Access Multiplexer (DSLAM) may contain a data entry string including substrings for: an IP address associated with a subscriber line connected to the DSLAM, an event code relating to an event on the subscriber line, a date and time of the event, and text relating to the event. From this data set, a regular expression may be used to identify and extract substrings from the data entry string. For example, the regular expression (\d+\.\d+\.\d+\.\d+) may be used to identify and extract all dotted decimal IPv4 addresses from the data set. More complex regular expressions may be used to identify particular patterns within substrings of a data entry string, such that an IP address and an event code are identified and extracted. This data can then be sorted into a structured format for further analysis.

Thus, creation of suitable regular expressions for data extraction has been a useful tool for automating data extraction from semi-structured data, such as log files. The process of creating suitable regular expressions typically involves an operator manually reviewing log files, recognizing patterns of substrings that are of significance, and creating a regular expression which could be run to identify that pattern of substrings in future log files. Of course, such a process is time consuming and prone to human-error. In an effort to automate this process, programs were developed to scan through homogeneously-structured log data and identify patterns of substrings and automatically create a corresponding regular expression.

An example program which illustrates such a prior art process is known as "RecordBreaker", details of which can be found at http://cloudera.github.io/RecordBreaker/. RecordBreaker first generates a parser that breaks each record into typed fields. It then guesses appropriate labels for the fields making use of a large dictionary of data formats and types. This approach is good for data sets containing structured records all of which conform to the same format. It cannot deal with heterogeneous formats within a given data set, or extract data that is embedded in human-readable text fields.

There are also programs that use regular expressions to recognise and extract potentially significant patterns of substrings (e.g. dates) embedded within unstructured data sets. However, such programs often misinterpret the significance of a pattern of substrings as the context of the data entry was lost (for example, a regular expression for identifying an event code and associated date and time within a data set could not recognise if the date and time was when the event occurred or when the event was recorded).

It is therefore desirable to alleviate some or all of the above problems.

SUMMARY OF THE INVENTION

According to a first aspect of the invention, there is provided a computer implemented method for creating a regular expression for extracting data from a data set, the method comprising the steps of: identifying a first common substring, the first common substring being a substring that is present in at least two data entry strings of a first data set, by comparing a first and second data entry string of the first data set; and creating a first regular expression for extracting data from a second data set, the first regular expression including a first part for matching the first common substring.

The present invention provides a method which identifies substrings which are common to two data entry strings of a data set. The invention is particularly useful for identifying fixed substrings (e.g. text inserted into every data entry of a particular type), and thus also indirectly identifies variable substrings representing parameters of the data entry string as those between the identified fixed substrings. Then, a regular expression may be created for extracting data matching the common substring from another data set. Furthermore, the fixed substrings often convey the semantic context of the parameters of the variable substrings. This is useful information when creating computational rules defining how the data extracted by the regular expression should be used.

The method may further comprise the steps of: identifying a first matching substring within the first data entry string using a token regular expression, the token regular expression representing a data type, wherein the first regular expression further includes a second part for matching the first matching substring. Thus, the method may use a combination of two complementary techniques. One technique (which uses token regular expressions to identify matching substrings) is particularly apt at identifying substrings which represent frequently occurring variables, although it is not particularly useful for extracting substrings which represent variables without a well-defined format (e.g. usernames). However, the other technique (which identifies substrings that are common to several data entries) is apt at identifying fixed substrings within a data entry (which typically originate from text of the format string used during creation of the data entry), and any substrings between the fixed substrings may be indirectly identified as variable substrings. Thus, the second technique is apt at identifying further variable substrings in the data entry and the surrounding fixed substrings (which help convey the context of the variables and the semantics of the entry).

The method may further comprise the steps of: identifying the first matching substring and a first unmatched substring within the first data entry string using the token regular expression; identifying a second matching substring and a second unmatched substring within the second data entry string using the token regular expression; and identifying the first common substring by comparing the first unmatched substring with the second unmatched substring.

The method may further comprise the steps of: determining if the first common substring satisfies a test criterion; and, if so, creating the first regular expression for extracting data from a second data set.

The method may further comprise the steps of: determining if the first common substring satisfies a test criterion; and, if not, identifying a third matching substring and a third unmatched substring within a third data entry using the token regular expression; and identifying a second common substring, the second common substring being present in at least two data entries of the first data set, by comparing the first unmatched substring with the third unmatched substring.

The method may further comprise the steps of: determining if the second common substring satisfies a test criterion; and, if so, creating a second regular expression for extracting data from the second data set, the second regular expression including a first part for matching the first matching substring and a second part for matching the second common substring.

The method may further comprise the steps of: determining if the second common substring satisfies a test criterion; and, if not, identifying a third common substring, the third common substring being present in at least two data entries of the first data set, by comparing the second unmatched substring with the third unmatched substring.

The first data set may include a plurality of data entries each formed from an unknown format string.

The second data entry string may be of the second data set. Thus, a data entry which is not matched by any regular expressions created based on the first data set may be processed to create a new regular expression.

The method may further comprise the steps of: using the first regular expression to extract data from the second data set; and processing the extracted data. The extracted data may be processed according to an editable rule. Furthermore, the token regular expression may be editable.

There is also provided a non-transitory computer-readable storage medium storing a computer program or suite of computer programs which upon execution by a computer system performs the method of the first aspect of the invention. A system comprising a processor and a memory configured to perform the method of the first aspect of the invention is also provided.

BRIEF DESCRIPTION OF THE FIGURES

In order that the present invention may be better understood, embodiments thereof will now be described, by way of example only, with reference to the accompanying drawings in which:

FIG. 7 is an example of a data set processed by the computer system of FIG. 1.

DETAILED DESCRIPTION OF EMBODIMENTS

Figure 1:
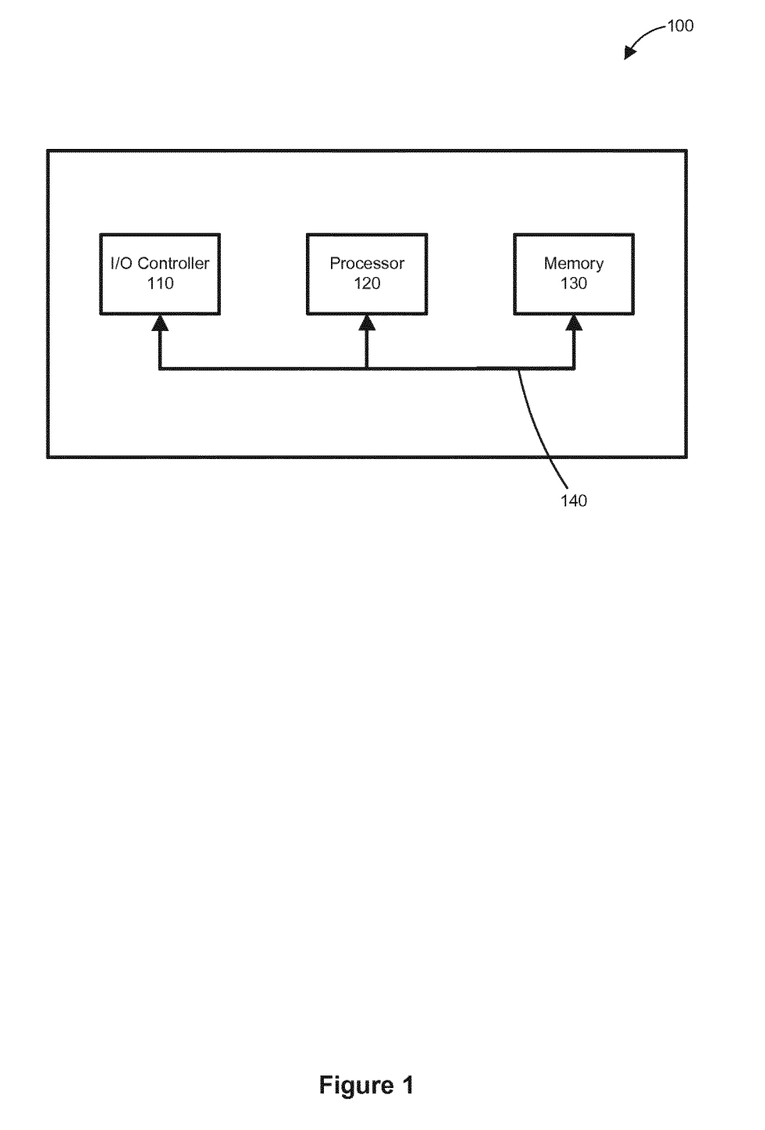
FIG. 1 is a schematic diagram illustrating an embodiment of a computer system of the present invention.

A first embodiment of a computer system 100 of the present invention will now be described with reference to FIGS. 1 to 3. FIG. 1 is a schematic diagram illustrating a computer system 100 having one or more input/output controllers 110, processing modules 120 and memory modules 130. The various modules of the computer system 100 are communicably connected to one another via a bus 140.

The processing modules 120 are configured to receive data from one or more data sources. The data may be generated within the computer system 100, or alternatively the data may be generated externally and then imported into the computer system 100 in any suitable manner. This data may be stored in a memory module 130 before the processing module 120 acts upon it. Alternatively, the data may be acted upon on the fly by the processing module 120 as it is generated within or input into the computer system 100. In this embodiment, the data is a semi-structured data set (described in the next paragraph) in the form of log files.

A semi-structured data set is a data set including both structured and unstructured data. In this context, structured data comprises data entries having regular and well-defined formats and semantics (e.g. a relational database), whereas unstructured data comprises data entries having free form text. Semi-structured data thus comprises structured and unstructured components. A common example of a semi-structured data set is log data. Log data typically comprises a first part recording a log code and associated variables (the structured component) and a second part recording human-readable text (the unstructured component). Log data can be produced by a wide range of computer systems. For example, in the ICT sector, a vast amount of log data is produced by computer systems for network traffic analysis or for monitoring network components (e.g. DSLAMs). Typically, a data entry in the log data is created by a suitably configured processor on a computer system (such as the processing module 120 of the computer system 100 of the present invention) in order to record an event or other information of significance in human-readable form.

To generate the data entry, the processor implements a data entry generation function which receives an input message comprising a type code and one or more parameter values. The data entry generation function performs a look-up operation using the type code to determine which format string should be used to express the data entry. The format string is a template consisting of a mixture of fixed substrings and format specifiers. The fixed substrings represent fixed data and are populated with text appropriate for the message type. The format specifiers are place-holders for variable data which will be replaced with parameter values (including the parameter values from the input message and any parameter values generated by the computer system 100 (e.g. recording a timestamp for the generation of the data entry)) according to the specified format during the data entry generation process. The data entry generation function therefore outputs a data entry based on the format string template, including the text for the message type in the fixed substrings and the parameter values (from the input message and those generated by the computer system) in the variable substrings.

Many computer systems (particularly in the ICT sector) produce log data with a vast number of data entries. The number of data entries within this log data makes it difficult to analyse manually or using traditional data processing techniques. Accordingly, the computer system 100 is configured to implement an embodiment of a method of the present invention in order to create a plurality of data extraction rules. These data extraction rules may be applied to a data set (such as log data or any other semi-structured data set) in order to characterise substrings of data entries and re-express them in a form in which they may then be analysed further. An embodiment of the method of the present invention will be described in more detail below, but firstly an overview of the functional components of the computer system 100 will be described with reference to FIGS. 2 to 3.

The Components of Computer System 100

Figure 2:
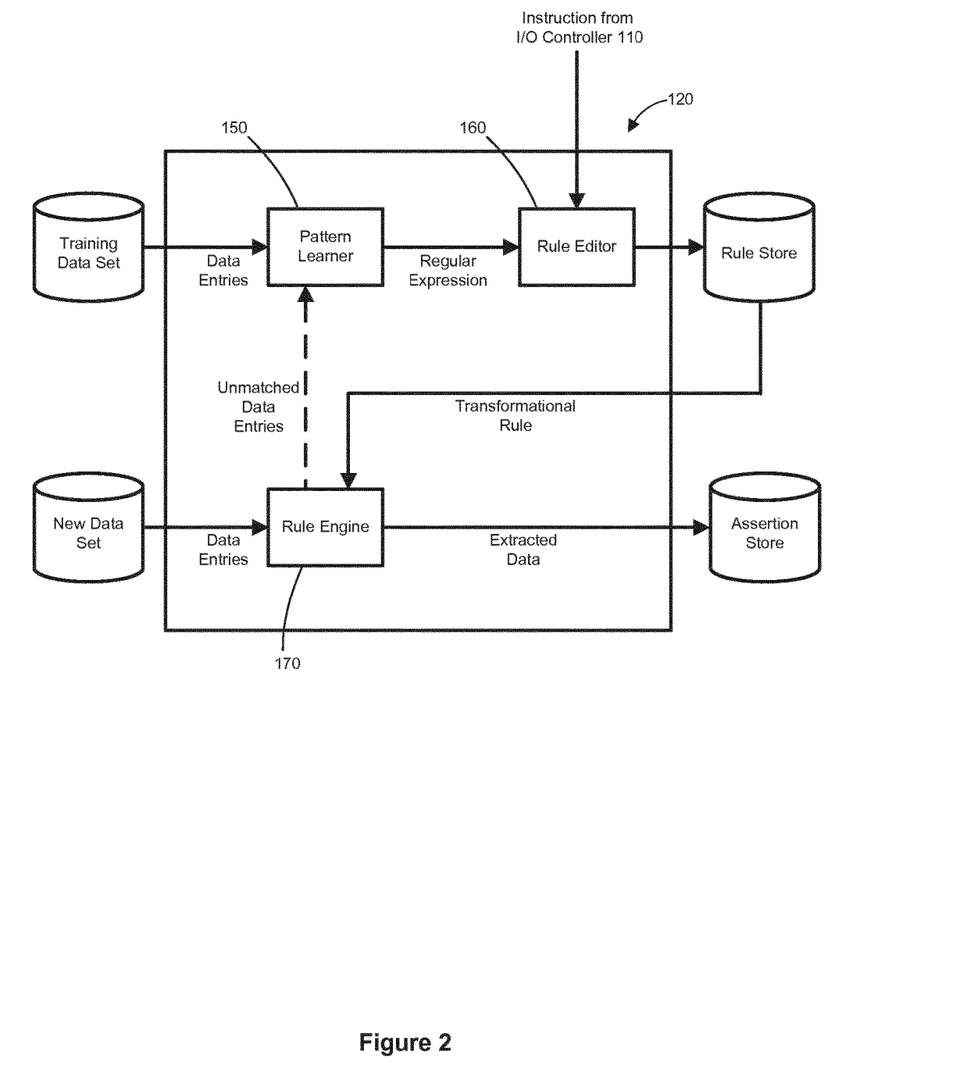
FIG. 2 is a schematic diagram illustrating a processing module of the computer system of FIG. 1.

FIG. 2 is a schematic diagram illustrating a functional overview of the processing module 120. The processing module 120 includes a pattern learner module 150, which is adapted to analyse a training data set in order to create a plurality of regular expressions. As is known in the art, a regular expression can be used to extract a substring of a data from a data set when that substring has the form expressed in the regular expression. The training data set may be an input feed of data arriving via input/output controller 110, or may be a stored data set on memory module 130. The pattern learner module 150 will be described in more detail, below.

The processing module 120 also includes a rule editor module 160, which is configured to receive a plurality of regular expressions from the pattern learner module 150. The rule editor 160 is adapted to create a transformational rule for each regular expression received from the pattern learner module 150, defining what substring(s) of a data entry to extract from a data set having the form expressed in the regular expression and how the extracted substring(s) should be asserted. With correct configuration, the transformational rule may be used to extract certain data entries (or substrings thereof) and express the extracted data in a form in which the semantic information content is explicitly represented and may be processed automatically. For example, the transformational rule may be used to extract substrings relating to a particular error code and the IP address of the entity causing the error. The associated assertion may be to raise an alarm with the Network Operator when a certain number of these errors occur for the same IP address. The rule editor module 160 may operate in either an automatic, semi-automatic or manual mode to create each transformational rule, which may then be stored in a rule store of the memory module 130. Accordingly, the rule editor module 160 further comprises a user input (e.g. via the input/output controller 110), such that the transformational rule may be user configured.

The processing module 120 also includes a rule engine module 170, which receives a plurality of transformational rules (each based on one of the plurality of regular expressions created by the pattern learner module 150) from the rule store of the memory module 130, and a new data set. The new data set may be either an input feed of data arriving via the input/output controller 110, or may be a stored data set on the memory module 130, but is distinct from the training data set used by the pattern learner 150 to create the regular expressions. Thus, the rule engine module 170 applies each transformational rule (based on the regular expressions generated from the training data set) to the new data set, and thus any data entry within the new data set having a substring which matches a regular expression of the transformational rule has the associated transformation function applied to it. Any data extracted in this manner may be stored in the assertion store portion of the memory module 130.

As shown by the dotted line between the rule engine module 170 and the pattern learner module 150, any unmatched data entry from the new data set (that is, a data entry which does not match any regular expression of any one of the transformational rules) may be sent to the pattern learner module 150 for analysis. Accordingly, the pattern learner module 150 may create a new regular expression based on this unmatched data entry, which may then be passed to the rule editor module 160 to create an associated transformational rule. The new transformational rule based on the regular expression for this unmatched data entry may then be applied to any subsequent data entry of the new data set.

Figure 3:
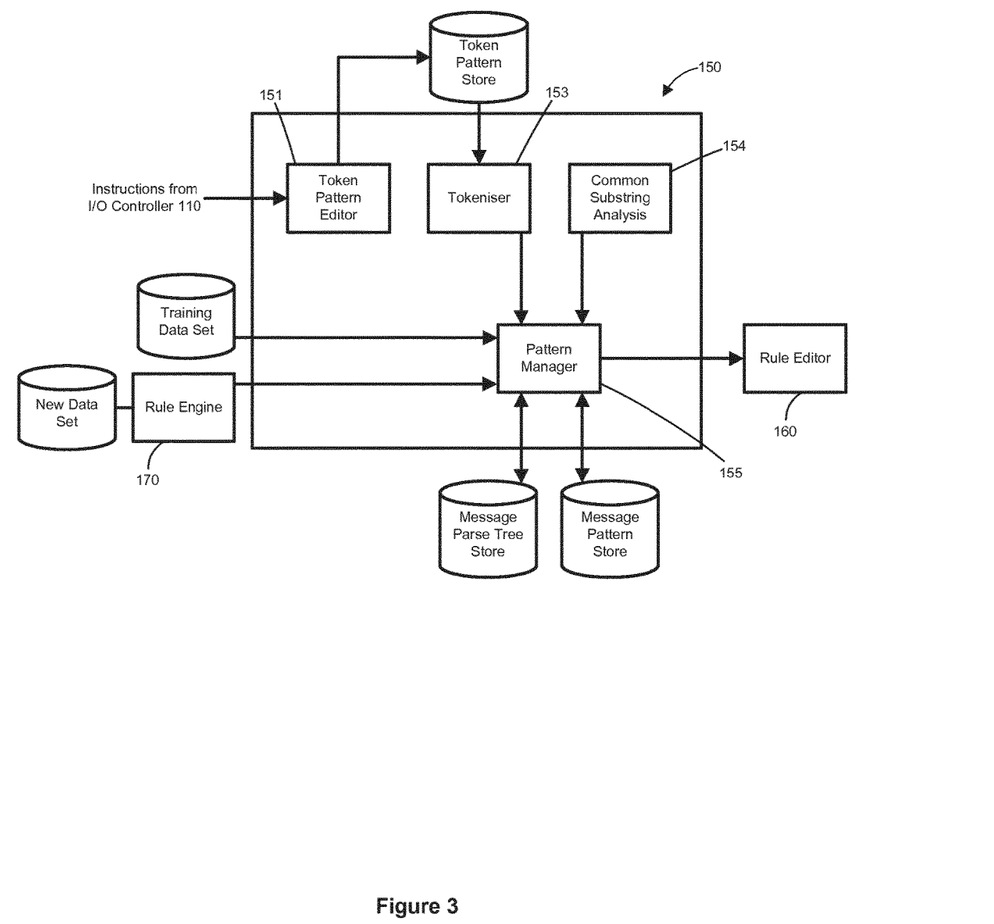
FIG. 3 is a schematic diagram illustrating a pattern learner module of the processing module of FIG. 2.

A more detailed illustration of the pattern learner module 150 is shown in FIG. 3. As shown, the pattern learner module 150 includes a token pattern editor 151, a tokeniser module 153, a common substring analyser module 154, and a pattern manager 155. These modules may communicate with the training and new data sets and a token pattern store, message parse tree store and message pattern store. The storage modules may be part of the memory module 130 or may be distinct. The pattern manager 155 is adapted to create regular expressions based on data entries from the training data set or based on unmatched data entries from the new data set. This is achieved using the tokeniser and common substring analyser modules 153, 154 (which will be described in more detail below in the context of the method of the present invention) and the message parse tree and message pattern stores. The tokeniser module 153 uses a plurality of token patterns stored in the token pattern store, which may be edited (either automatically or manually via the input/output controller 110) via the token pattern editor module 151.

An Embodiment of a Method of the Present Invention

The computer system 100 and its various modules are configured to implement a method of the present invention in order to create a plurality of data extraction rules. An embodiment of the method of the present invention will now be described with reference to FIGS. 4 to 6.

Figure 4:
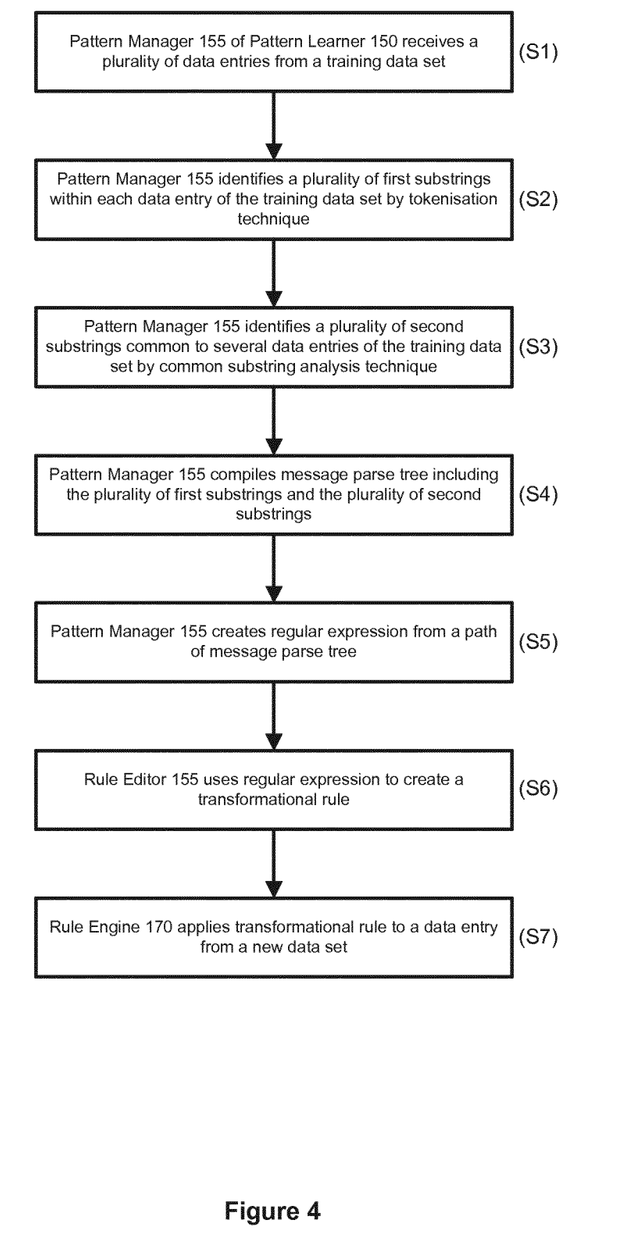
FIG. 4 is a flow diagram illustrating an embodiment of a method of the present invention.

FIG. 4 is a flow diagram illustrating the embodiment of the method of the present invention. In step S1, the pattern manager module 155 of the pattern learner module 150 receives a plurality of data entries from a training data set. The pattern manager module 155 implements a combination of two complementary techniques—tokenisation and common substring analysis in order to produce a set of regular expressions which correspond to the format string (i.e. the templates of the data entry generation function) used to originally create the data entries of the training data set.

Tokenisation

A first technique, implemented in step S2 by the pattern manager 155 in conjunction with the tokeniser module 153 and message parse tree store, is known as tokenisation. An overview of the process of tokenisation being implemented in isolation will now be described with reference to FIG. 5, before describing how it is implemented in combination with the second technique (common substring analysis) in the present invention.

Figure 5:
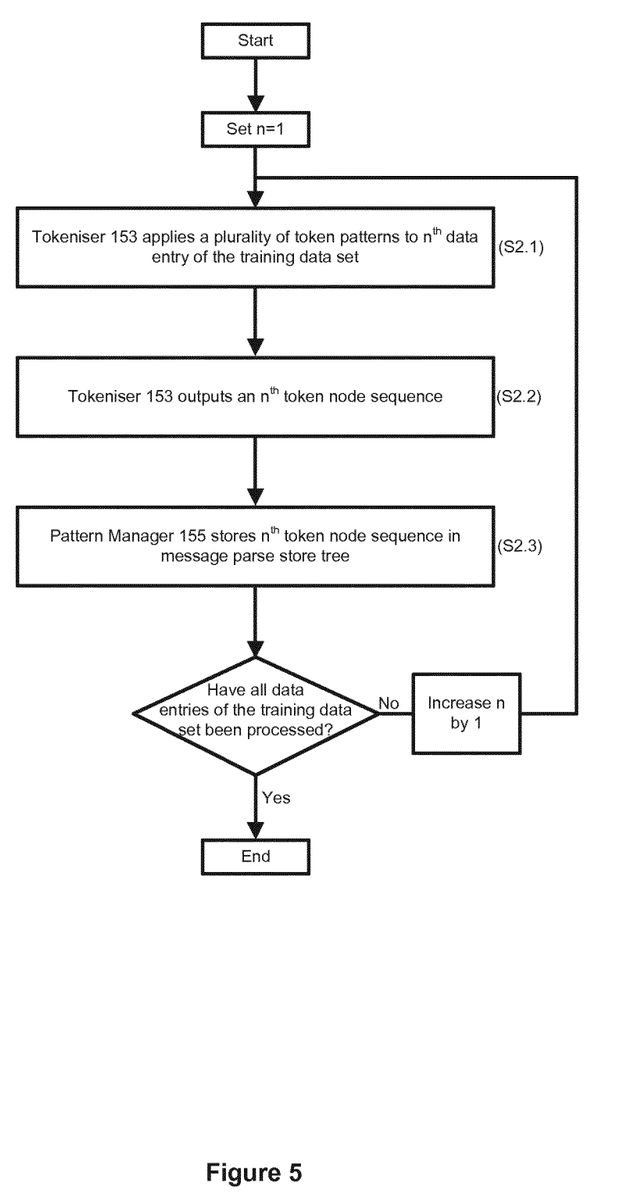
FIG. 5 is a flow diagram illustrating an example tokenisation technique of the method of FIG. 4.

The aim of tokenisation is to identify one or more variable substrings within a data entry, the variable substrings being instances of variable data types (such as date, IP address, etc.), and thus are likely to represent the parameter values from the input message (used by the data entry generating function) and those generated by the computer system 100 during creation of the data entry. This is achieved by the tokeniser module 153 using a plurality of token patterns, each representing a data type (the token patterns themselves being expressed as regular expressions), to identify variable data types within the data entry. For example, the token pattern (\d+\.\d+\.\d+\.\d+) can be used to identify a dotted decimal IP (V4) address within the data entry. The token pattern editor module 151 may be used to edit existing token patterns or to create new token patterns for other variables. Accordingly, the tokeniser module 153 takes a first data entry of the plurality of data entries of the training data set as an input, matches the plurality of token patterns within token pattern store with the data entry (step S2.1), and outputs a first token node sequence (S2.2). The token node sequence comprises a root node, a plurality of intermediate nodes, and a leaf node, wherein the intermediate nodes represent a particular substring of the data entry and indicate whether or not that substring matched a token pattern from the token pattern store. If there was a match, then the intermediate node includes a match element which is represented by an identifier for the particular data type matched by the token pattern. If there wasn't a match, then the intermediate node includes an unmatched element which is represented by a literal string (that is, the exact characters from that substring of the original data entry string). The token node sequence is then stored in the message parse tree store (step S2.3).

A second data entry of the plurality of data entries of the training data set is then processed by the tokeniser module 153 in the same manner to produce a second token node sequence. This is then stored in the message parse tree store, and merged with the first token node sequence to create a message parse tree (wherein common nodes up to the first point of difference between the token node sequences become a common trunk of the message parse tree, and the remaining nodes in each sequence form two branches off the common trunk).

A third data entry of the plurality of data entries of the training data set is then processed by the tokeniser module 153 in the same manner to produce a third token node sequence. This is then stored in the message parse tree store and merged with the message parse tree. If a point of difference is found before reaching the branch point, the remaining nodes of the third sequence become a new branch from the common trunk at this point. If no point of difference is found before reaching the branch point, and the subsequent node in the third sequence is the same as the first node in one of the two branches, then merging continues along that branch until a point a point of difference is found, in which case the remaining nodes of the third sequence become a new branch at this point. If no point of difference is found before reaching the branch point, and the subsequent node in the third sequence is different from the first node of both the two branches, the remaining nodes of the third sequence become a new branch at this point (i.e. the two-way branch becomes a three-way branch).

This process is repeated for all data entries within the training data set.

Thus, the message parse tree comprises a plurality of paths from a root node to several leaf nodes, wherein each path represents a unique message pattern having a distinct sequence of nodes (wherein intermediate nodes having a matched element are represented by the identifier for the data type matched by the token pattern and intermediate nodes having an unmatched element are represented by a literal string). The pattern manager module 155 is configured to create a regular expression for each of these paths (i.e. paths from root to leaf in the message parse tree) by concatenating regular expressions associated with each intermediate node from the root to the relevant leaf of that particular path. The regular expression for any intermediate node in this path having a matched element is the regular expression used to identify the particular data type. The regular expression for any intermediate node in this path having an unmatched element is the regular expression that matches the literal string.

As noted above, the pattern manager 155 implements two complementary techniques to create the regular expressions. The second technique, implemented in step S3 (of FIG. 4) by the pattern manager 155 in conjunction with the common substring analyser module 154 and message pattern store 157, is known as common substring analysis.

Common Substring Analysis

The aim of common substring analysis is to identify one or more substrings within a data entry which represent fixed substrings, concluding that the remaining substrings are variable substrings. Thus, the common substring analysis technique is another way of identifying variable substrings within a data entry string, albeit via an indirect method. However, the fixed substrings surrounding the variable substrings typically convey semantic context of the variable substrings, which can be useful for data extraction. An overview of the process of common substring analysis when implemented in isolation will now be described with reference to FIG. 6, before describing how it is implemented in combination with the tokenisation technique.

Figure 6:
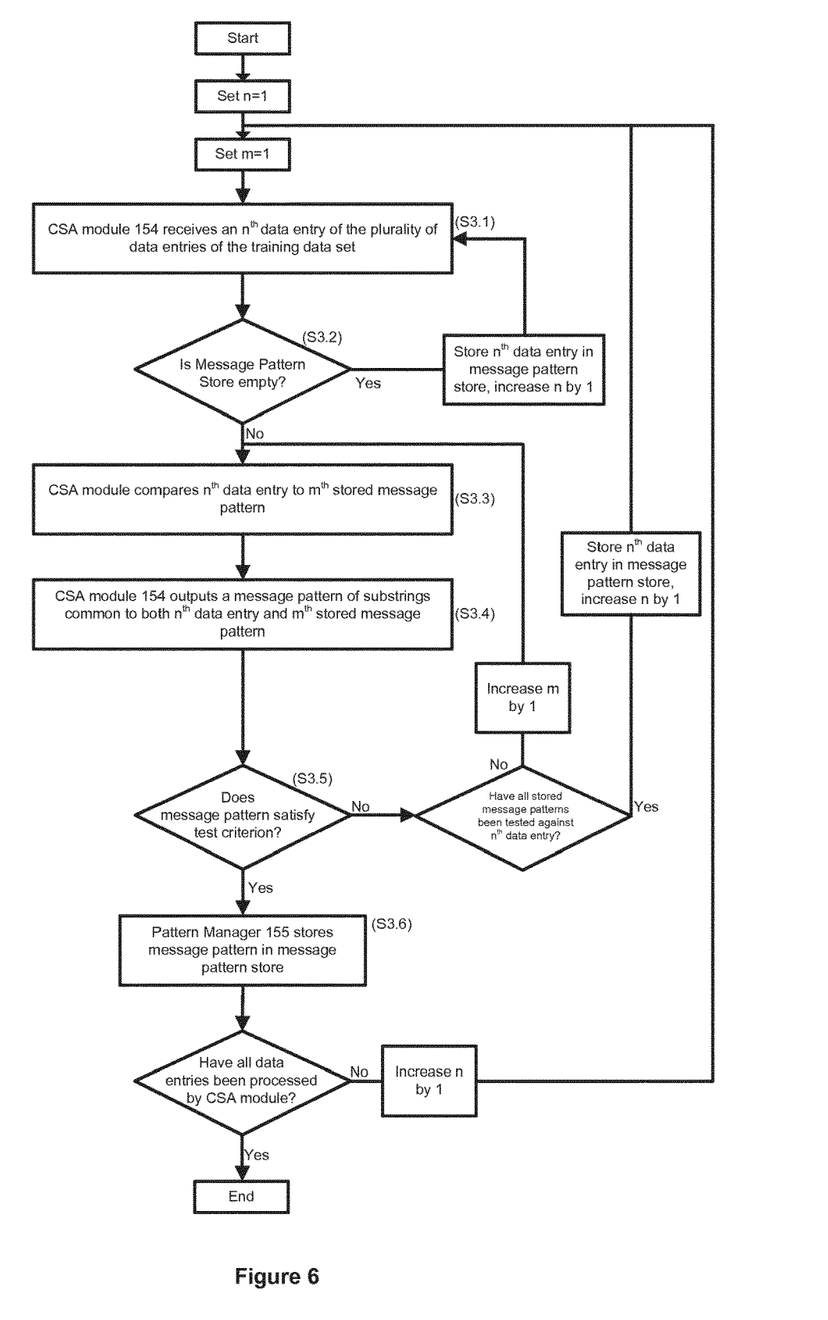
FIG. 6 is a flow diagram illustrating an example common substring analysis technique of the method of FIG. 4.

The common substring analyser module 154 receives a first data entry of the plurality of data entries of the training data set (step S3.1). The common substring analyser module 154 determines if the message pattern store has a stored message pattern (step S3.2). In this example, the message pattern store is initially empty and the first data entry is stored in the message pattern store and the process returns to step S3.1. In the next iteration of this technique, the common substring analysis module 154 receives a second data entry of the plurality of data entries of the training data set and, in this iteration, determines that the message pattern store contains a stored message pattern (i.e. the first data entry). Accordingly, the common substring analyser module 154 compares the first and second data entries (step S3.3) and returns a list of substrings that are present in both the first and second data entry and that appear in the same order. The common substring analyser module 154 thus outputs a message pattern string by concatenating these common substrings of the first and second data entries, interspersed by characters representing gaps (step S3.4). In step S3.5, the common substring analyser module 154 determines if the message pattern satisfies a test criterion (or criteria). The test criterion ensures that the common substring analysis process does not store trivial message patterns, e.g. by checking that it has a common substring exceeding a predetermined length, and/or a total length of common substrings exceeding a predetermined length. In this example, the message pattern after this iteration of the process does not meet the test criterion. As the only stored message pattern has been tested, the second data entry is stored in the message pattern store (together with the first data entry) and the process loops back to step S3.1.

In the next iteration of the method, the common substring analyser module 154 receives a third data entry of the plurality of data entries of the training data set. Again, the common substring analyser module 154 determines that the message pattern store 157 has stored message patterns (i.e. both the first and second data entries stored in the previous iterations of the process). Firstly, the common substring analyser module 154 compares the third data entry to the first data entry and returns a list of substrings that are present in both the first and third data entries. The new output message pattern is a concatenated string of common substrings between the first and third data entries and gap markers.

The common substring analysis module 154 then determines if the new message pattern satisfies the test criterion. In this example, the message pattern satisfies the test criterion, and so the message pattern is stored in the message pattern store, replacing the first data entry. The process then loops back to step S3.1 for the next data entry.

In the next iteration, the common substring analysis module 154 receives a fourth data entry of the plurality of data entries of the training data set and determines that the message pattern store 157 has stored message patterns (i.e. the message patterns stored in the previous iteration having passed the test criterion). The fourth data entry is then compared to the previously stored message pattern and a list of substrings that are present in both is returned. The common substring analysis module 154 then determines (as part of step S3.5) whether this list of common substrings is shorter than the previously stored message pattern, thus determining if a new variable substring is present within the common substring. If so, then a new message pattern (comprising a concatenated string of the common substrings and gap markers) satisfies the test criterion and so it replaces the previously stored message pattern.

The common substring analysis module 153 performs this process for all data entries in the training data set until all log entries have been analysed, resulting in a plurality of message patterns in message pattern store. The plurality of message patterns each have a string form of concatenated substrings (i.e. the identified common substrings) interspersed with gap markers representing variable fields of the log entries. The pattern manager 155 may then create a regular expression for each message pattern in the message pattern store 157 by replacing each common substring in the message pattern with a regular expression that matches that substring, and by replacing the gap characters with regular expressions that match one or more arbitrary characters.

The Combination of Tokenisation and Common Substring Analysis

As noted above, the pattern manager 155 uses both tokenisation and common substring analysis techniques. These two techniques are complementary and can be combined in order to produce an improved set of regular expressions for extracting substrings from an input data entry. An embodiment of this combined method will now be described.

As described above, during the tokenisation technique, the tokeniser 153 takes a first data entry of the plurality of data entries of the training data set as an input, matches the plurality of token patterns within token pattern store with the data entry, and outputs a first token node sequence. A node within the token node sequence having a matched element is represented by an identifier for the variable matched by the token pattern, and a node within the token node sequence having an unmatched element is represented by a literal string. The token node sequence is then stored in the message parse tree store. The tokeniser 153 then takes a second data entry of the plurality of data entries of the training data set, and, in the same manner, matches the plurality of token patterns within token pattern store with the second data entry, and outputs a second token node sequence. The tokeniser 153 then stores the second token node sequence in the message parse tree store.

As discussed above, the first and second token node sequences may be merged to create a message parse tree within message parse tree store. At this point, the tokenisation technique may be combined with the common substring analysis technique. Merger proceeds as for pure tokenisation except that when comparing unmatched elements of two nodes of two token node sequences (which include the literal strings from the substrings of the original data entry strings) in equivalent positions in the two token node sequences, common substring analysis is performed (by the common substring analysis module 154) rather than a simple check that the two strings are the same. If the list of common substrings resulting from the common substring analysis satisfies a test criterion, the two nodes of the two token node sequences are merged to form a single node on the message pattern, consisting of fixed substrings separated by gap markers, concluding that the substrings replaced by these gap markers are variables. Optionally, the test criterion may also impose conditions on the remaining unmerged parts of the token node sequences being merged. Thus, the common substring analysis technique works in conjunction with the tokenisation technique to identify fixed substrings and further variable substrings of a data entry.

Returning to FIG. 4, the message parse tree is then populated with further token node sequences as further data entries of the training data set are processed by the computer system 100 (step S4). The pattern manager 155 may then create a regular expression for each path of the message parse tree by concatenating regular expressions that match the matched elements, common elements and any remaining unmatched elements of each branch node of each path (step S5). As discussed above, the rule editor may then create a plurality of transformational rules, based on the plurality of regular expressions, for processing data entries of a new data set (step S6). Data entries from a new data set may then be processed using these transformational rules by the rule engine 170 (step S7). Furthermore, any data entry of the new data set which is not matched by one of the plurality of regular expressions may be fed back to the pattern manager for processing to create a new regular expression matching that data entry.

An example will now be described with reference to FIGS. 7 to 8. FIG. 7 illustrates part of an example training data set having a plurality of data entry strings (illustrating the various formats and variable parameter values included amongst the data entry strings). The skilled person will understand that the training data set will comprise many more data entry strings and that the parameter values have been replaced with identifiers for the data type to anonymise the data set.

Figure 8A:
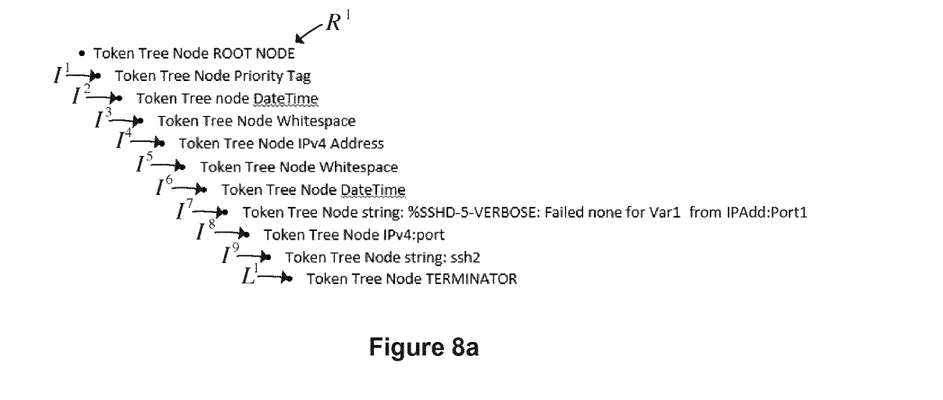
FIGS. 8a to 8d are examples illustrating how a message parse tree is created from the data set of FIG. 7 by the computer system of FIG. 1.

The first data entry string 1001 is processed by the tokeniser module 153 to produce a first token node sequence. The first token node sequence has the following form, [Root] [Priority Tag] [DateTime] [Whitespace] [IPv4 Address] [Whitespace] [DateTime] [string: % SSHD-5-VERBOSE: Failed none for Var1 for IPAdd2 from] [IPv4: port] [string: ssh2] [Terminator]. Thus, the token node sequence begins with a root node, ends in a leaf (or "terminator") node, and includes several intermediate nodes having either matched elements (e.g. a priority tag, date and time, whitespace (indicating a separator of some sort), IP address or IP address coupled with a port number), or unmatched elements (represented by the literal strings). As shown in FIG. 8a, the first token node sequence is stored in the message parse tree store as the first message pattern. The notation R, I and L signify the root, intermediate and leaf nodes of the first message pattern, and the number in superscript represents the particular node of that node type.

Figure 8B:
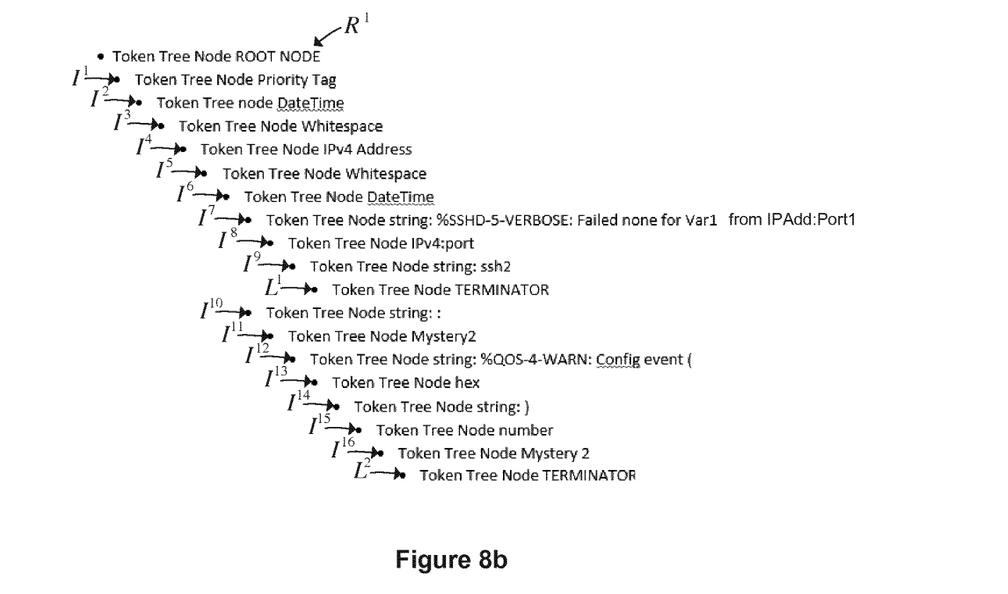

The second data entry string 1002 is then processed by the tokeniser module 153 to produce a second token node sequence. This is stored in the message parse tree store, and merged with the first token node sequence. As the first and second token node sequences share the same root node and first six intermediate nodes $I^{1 \cdots 6}$, these nodes are merged. As the seventh intermediate nodes for the first and second token node sequences both comprise an unmatched element (represented by a literal string), common substring analysis is performed to determine if there are any common elements between the two. As there are no common elements from the seventh intermediate node $I^7$ onwards, the second message pattern follows a separate path to its own leaf node $L^2$. The two distinct paths from root node to the first and second leaf nodes thus become the first and second message patterns, as shown in FIG. 8b (which illustrates the second message pattern as comprising the first root node $R^1$, intermediate nodes $I^{1 \cdots 6, 10 \cdots 16}$ and the second leaf node $L^2$).

Figure 8C:
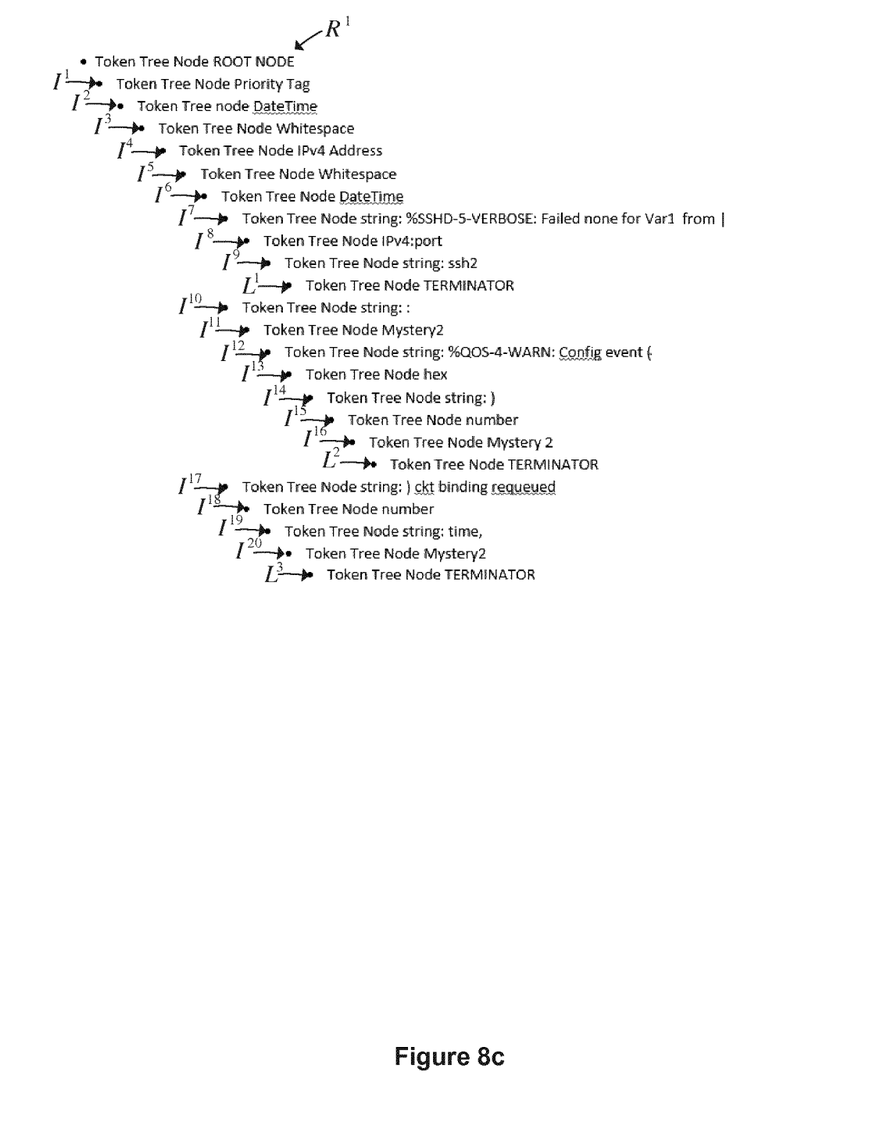
Figure 8D:
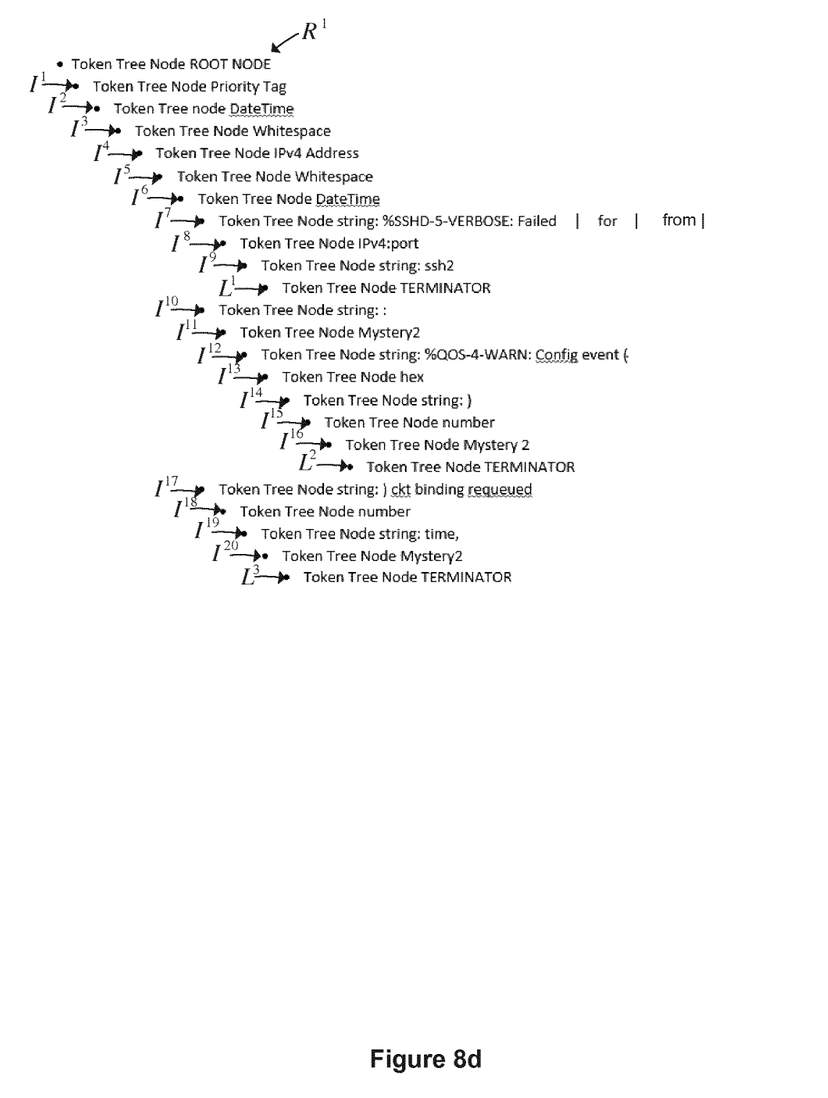

The third data entry string 1003 is then processed by the tokeniser 153 to produce a third token node sequence. This is stored and merged with the message parse tree. The third token node sequence shares the same root node and first six intermediate nodes with the trunk that is common to the first and second message patterns ($I^{1 \cdots 6}$), so these nodes are merged with the trunk. Again, the seventh intermediate node of the third token node sequence comprises an unmatched element (represented by a literal string), so common substring analysis is sequentially performed to determine if there are any common elements between this node and the seventh intermediate nodes of the first and second message pattern ($I^7$, $I^{10}$). Again, there are no common elements, so the seventh intermediate node of the third token node sequence follows a separate path to its own leaf node, as shown in FIG. 8c (which illustrates the third message pattern as comprising the first root node $R^1$, intermediate nodes $I^{1 \cdots 6, 17 \cdots 20}$ and the third leaf node $L^3$).

The fourth data entry string 1004 is then processed by the tokeniser module 153 to produce a fourth token node sequence. This is stored and merged with the message parse tree. The fourth token node sequence is found to have identical nodes to those of the second message pattern, so no new branch is added to the tree. At this point, a counter for the number of data entries of the second message pattern may be increased.

Skipping forward a number of iterations, the computer system 100 processes the thirteenth data entry string 1013, producing a thirteenth token node sequence by the tokenisation technique. This is then stored in the message parse tree store and merged with the message parse tree. The thirteenth token node sequence shares the same root node and first six intermediate nodes with the first, second and third message patterns, so these nodes are merged. The seventh intermediate node for the thirteenth token node sequence comprises an unmatched element (represented by a literal string), so common substring analysis is initially performed between this node and the seventh intermediate node of the first message pattern. The common substring analysis between the seventh intermediate nodes of the thirteenth token node sequence and the first message pattern identify a plurality of common elements (i.e. "% SSHD-5-VERBOSE: Failed none for Var1 from" in FIG. 7), and a plurality of further unmatched elements (i.e. "IPAdd:Port1", and "IPAdd:Port2" in FIG. 7). The list of common elements satisfies the test criterion so the unmatched element of the seventh intermediate node of the first message pattern is replaced with corresponding common and further unmatched elements. The message parse tree at this stage is shown in FIG. 8c, in which the further unmatched element is represented by a "I" character. As the list of common elements satisfied the test criterion, no further common substring analysis is performed between the thirteenth token node sequence and nodes of any other message pattern.

Skipping forward a number of iterations, the computer system 100 processes the nineteenth data entry string 1019, producing a nineteenth token node sequence by the tokenisation technique. This is then stored in the message parse tree store and merged with the message parse tree. Again, the nineteenth token node sequence shares the same first six intermediate nodes as the first message pattern, so these nodes are merged. The seventh intermediate node for the nineteenth token node sequence comprises an unmatched element (represented by a literal string), so common substring analysis is initially performed with the first message pattern. The common substring analysis between the seventh intermediate nodes of the nineteenth token node sequence and that of the first message pattern identify a plurality of common elements (i.e. "% SSHD-5-VERBOSE: Failed", "for", and "from" in FIG. 7) and a plurality of further unmatched elements (i.e. "Var1", "IPAddPort1", "Var13", "Var14" and "IPAdd:Port3"). The list of common elements and unmatched elements differs from those produced by common substring analysis between the seventh intermediate nodes of the thirteenth data entry string and the first message pattern in that the terms "none" and "Var1" (which were previously found to be common elements between the first message pattern and the thirteenth token node sequence) are now found to be a further unmatched elements. The computer system 100 then determines whether the new list of common elements satisfies the test criterion, which includes determining that it has identified further unmatched elements. The common elements "none" and "Var1" of the seventh intermediate node of the first message pattern are then replaced with further unmatched elements in the message parse tree, shown in FIG. 8*d* (wherein the further unmatched elements are represented by "I" characters in FIG. 8*d*. No further common substring analysis occurs as the list of common elements satisfies the test criterion (the skilled person will understand that if the list of common elements did not pass this test, then the computer system 100 would sequentially perform common substring analysis with the seventh intermediate nodes of any remaining stored message patterns).

The computer system 100 processes all data entry strings in the training data set. A message pattern within the message parse tree may then be converted to regular expressions by replacing the matched elements identified by the tokenisation technique with the corresponding regular expression (i.e. the token pattern used to match that substring), all common elements with a regular expression that matches exactly that substring, and all further unmatched elements indirectly identified by the common substring analysis with a regular expression that matches one or more arbitrary characters. The regular expression can then be used by the rule editor module to create a transformational rule for subsequently analysed data sets.

The above example illustrates how the tokenisation and common substring analysis techniques work synergistically to identify the fixed and variable substrings within the data entry strings. That is, the tokenisation function is effective at identifying regularly occurring variables such as dates, times, IP addresses etc., but not so effective at identifying variables without a defined format such as usernames. Conversely, common substring analysis is effective at identifying fixed elements of a data entry and variables without a defined format, but not regularly occurring variables which have a well-defined format. Thus, the two techniques complement each other when reverse engineering the format string used to create the data entry. Furthermore, by identifying the fixed elements of the data entry (which usually represent fixed text of the format string used to create the data entry), the method also identifies the elements that convey the semantic context of the variables, helping the computer system and/or user create more appropriate transformational rules.

The skilled person will understand that it is non-essential for the present invention to use both techniques in order to create regular expressions for extracting data from a new data set. That is, the present invention may implement only the common substring analysis technique (as detailed above with reference to FIG. 6). However, the skilled person will also understand that the invention is improved by using both techniques in combination.

The term 'regular expression' is used throughout the description, which the skilled person will understand consists of meta-data written in a formal language that other programs can use to match text patterns and extract values occurring within the match. Furthermore, the skilled person will understand that the term "string" and "substring" cover a contiguous set of characters including gaps, such that a common substring is a contiguous set of characters (including gaps) that is present in at least two data entries.

In an alternative approach to combining the two techniques, common substring analysis is applied first resulting in message patterns comprising a mixture of common elements and literal strings. Then, tokenisation may be applied to identify matching elements within the common elements and the literal strings.

The embodiments above describe how substrings of a data entry may be analysed. However, the skilled person will understand that the method equally applies to whole data entry strings.

The skilled person will understand that any combination features is possible within the scope of the invention, as claimed.

The invention claimed is:

1. A computer implemented method for creating a regular expression for extracting data from a data set, the method comprising the steps of:
   identifying a first common substring, the first common substring being a substring that is present in at least two data entry strings of a first data set, by comparing a first and second data entry string of the first data set;
   identifying a first matching substring within the first data entry string using a token regular expression, the token regular expression representing a data type; and
   creating a first regular expression for extracting data from a second data set, the first regular expression including a first part for matching the first common substring and a second part for matching the first matching substring.

2. A computer implemented method as claimed in claim 1, further comprising the steps of:
   identifying the first matching substring and a first unmatched substring within the first data entry string using the token regular expression;
   identifying a second matching substring and a second unmatched substring within the second data entry string using the token regular expression; and
   identifying the first common substring by comparing the first unmatched substring with the second unmatched substring.

3. A computer implemented method as claimed in claim 2, further comprising the steps of:
   determining if the first common substring satisfies a test criterion; and, if so,
   creating the first regular expression for extracting data from a second data set.

4. A computer implemented method as claimed in claim 2, further comprising the steps of:
   determining if the first common substring satisfies a test criterion; and, if not,
   identifying a third matching substring and a third unmatched substring within a third data entry using the token regular expression; and
   identifying a second common substring, the second common substring being present in at least two data entries of the first data set, by comparing the first unmatched substring with the third unmatched substring.

5. A computer implemented method as claimed in claim 4, further comprising the steps of:
   determining if the second common substring satisfies a test criterion; and, if so,
   creating a second regular expression for extracting data from the second data set, the second regular expression including a first part for matching the first matching substring and a second part for matching the second common substring.

6. A computer implemented method as claimed in claim 4, further comprising the steps of:
  determining if the second common substring satisfies a test criterion; and, if not,
  identifying a third common substring, the third common substring being present in at least two data entries of the first data set, by comparing the second unmatched substring with the third unmatched substring.

7. A computer implemented method as claimed in claim 1, wherein the second data entry string is of the second data set.

8. A computer implemented method as claimed in claim 1, further comprising the steps of:
  using the first regular expression to extract data from the second data set; and
  processing the extracted data.

9. A computer implemented method as claimed in claim 8, wherein the extracted data is processed according to an editable rule.

10. A computer implemented method as claimed in claim 1, wherein the token regular expression is editable.

11. A computer implemented method as claimed in claim 1, wherein the first data set includes a plurality of data entries each formed from an unknown format string.

12. A non-transitory computer-readable storage medium storing a computer program comprising instructions which, when the program is executed by a computer, cause the computer to perform steps comprising:
  identifying a first common substring, the first common substring being a substring that is present in at least two data entry strings of a first data set, by comparing a first and second data entry string of the first data set;
  identifying a first matching substring within the first data entry string using a token regular expression, the token regular expression representing a data type; and
  creating a first regular expression for extracting data from a second data set, the first regular expression including a first part for matching the first common substring and a second part for matching the first matching substring.

13. The non-transitory computer-readable storage medium of claim 12, wherein the computer is caused to further perform:
  identifying the first matching substring and a first unmatched substring within the first data entry string using the token regular expression; and
  identifying a second matching substring and a second unmatched substring within the second data entry string using the token regular expression; and identifying the first common substring by comparing the first unmatched substring with the second unmatched substring.

14. The non-transitory computer-readable storing medium of claim 12, wherein the computer is caused to further perform:
  using the first regular expression to extract data from the second data set; and
  processing the extracted data.

15. A system comprising: a processor and a memory storing instructions which are executable by the processor such that the system is configured at least to:
  identify a first common substring, the first common substring being a substring that is present in at least two data entry strings of a first data set, by comparing a first and second data entry string of the first data set;
  identify a first matching substring within the first data entry string using a token regular expression, the token regular expression representing a data type; and
  create a first regular expression for extracting data from a second data set, the first regular expression including a first part for matching the first common substring and a second part for matching the first matching substring.

16. The system in claim 15, wherein the system is further configured to:
  identify the first matching substring and a first unmatched substring within the first data entry string using the token regular expression;
  identify a second matching substring and a second unmatched substring within the second data entry string using the token regular expression; and
  identify the first common substring by comparing the first unmatched substring with the second unmatched substring.

17. The system in claim 15, wherein the system is further configured to:
  use the first regular expression to extract data from the second data set; and
  process the extracted data.

* * * * *